United States Patent
Goggin et al.

(10) Patent No.: US 11,182,344 B2
(45) Date of Patent: Nov. 23, 2021

(54) FILE GRANULAR DATA DE-DUPLICATION EFFECTIVENESS METRIC FOR DATA DE-DUPLICATION

(71) Applicant: VMware, Inc., Palo Alto, CA (US)

(72) Inventors: Edward J Goggin, Concord, MA (US); Sandeep Rangaswamy, Mountain View, CA (US); Kiran Joshi, San Jose, CA (US); Srinath Premachandran, Fremont, CA (US); Gopala Suryanarayana, Sunnyvale, CA (US); Radu Berinde, Cambridge, MA (US); Wenguang Wang, Santa Clara, CA (US); Jorge Guerra Delgado, Fremont, CA (US); Jin Zhang, Fremont, CA (US); Radhika Vullikanti, Foster City, CA (US)

(73) Assignee: VMWARE, INC., Palo Alto, CA (US)

( * ) Notice: Subject to any disclaimer, the term of this patent is extended or adjusted under 35 U.S.C. 154(b) by 701 days.

(21) Appl. No.: 15/068,988

(22) Filed: Mar. 14, 2016

(65) Prior Publication Data
US 2017/0262465 A1    Sep. 14, 2017

(51) Int. Cl.
*G06F 16/00* (2019.01)
*G06F 16/174* (2019.01)
*H04L 29/08* (2006.01)

(52) U.S. Cl.
CPC ...... *G06F 16/1748* (2019.01); *H04L 67/1004* (2013.01); *H04L 67/1097* (2013.01)

(58) Field of Classification Search
CPC ........ G06F 16/17; G06F 16/27; G06F 16/174; G06F 16/182; G06F 16/215; G06F 16/1727; G06F 16/1748; G06F 16/1752; G06F 16/1756
USPC .......................................................... 707/692
See application file for complete search history.

(56) References Cited

U.S. PATENT DOCUMENTS

| | | | |
|---|---|---|---|
| 8,171,063 B1* | 5/2012 | Janakiraman | G06F 16/1752 707/822 |
| 8,442,952 B1* | 5/2013 | Armangau | G06F 16/1752 707/686 |
| 9,026,752 B1* | 5/2015 | Botelho | G06F 11/1456 711/162 |
| 9,053,124 B1* | 6/2015 | Dornquast | G06F 11/1453 |
| 9,152,550 B1* | 10/2015 | Taylor | G06F 12/0246 |
| 9,384,206 B1* | 7/2016 | Bono | G06F 3/0683 |
| 9,471,585 B1* | 10/2016 | Theimer | G06F 3/0641 |
| 9,479,585 B1* | 10/2016 | Jobanputra | G06F 16/188 |
| 9,529,545 B1* | 12/2016 | Bono | G06F 3/0685 |
| 9,639,433 B2* | 5/2017 | Rabinovich | G06F 11/1453 |
| 9,811,424 B2* | 11/2017 | Chavda | G06F 16/182 |
| 9,891,860 B1* | 2/2018 | Delgado | G06F 3/0689 |
| 10,007,671 B1* | 6/2018 | Bono | G06F 3/0665 |
| 10,089,308 B1* | 10/2018 | Stacey | G06F 16/93 |

(Continued)

*Primary Examiner* — Ashish Thomas
*Assistant Examiner* — Rezwanul Mahmood (57) ABSTRACT

In accordance with the present disclosure, files may be deduplicated in a distributed storage system having a plurality of storage volumes. A uniqueness metric for each file may indicate a degree of deduplication of the respective data files in the given storage volume. The uniqueness metric may be used to identify files for rebalancing in the distributed storage system. The uniqueness metric may be efficiently calculated with enough accuracy using a sampling methodology.

20 Claims, 9 Drawing Sheets

(56) References Cited

U.S. PATENT DOCUMENTS

| | | | | |
|---|---|---|---|---|
| 10,146,780 B1* | 12/2018 | Bassov | | G06F 16/1727 |
| 10,248,345 B1* | 4/2019 | Dickson | | G06F 16/10 |
| 10,423,495 B1* | 9/2019 | Guo | | G06F 11/1453 |
| 10,459,648 B1* | 10/2019 | Menezes | | G06F 3/065 |
| 10,481,820 B1* | 11/2019 | Dunbar | | G06F 3/0647 |
| 10,521,398 B1* | 12/2019 | Forrester | | G06F 16/137 |
| 2009/0276454 A1* | 11/2009 | Smith | | G06F 16/1756 |
| 2010/0077013 A1* | 3/2010 | Clements | | G06F 16/1748 |
| | | | | 707/822 |
| 2011/0295916 A1* | 12/2011 | Nichols | | G06F 16/1748 |
| | | | | 707/822 |
| 2012/0017027 A1* | 1/2012 | Baskakov | | G06F 11/1448 |
| | | | | 711/6 |
| 2012/0089578 A1* | 4/2012 | Lam | | G06F 16/1752 |
| | | | | 707/692 |
| 2012/0089764 A1* | 4/2012 | Baskakov | | G06F 3/065 |
| | | | | 711/6 |
| 2012/0158678 A1* | 6/2012 | McGraw | | G06Q 30/02 |
| | | | | 707/694 |
| 2012/0226722 A1* | 9/2012 | Van Buskirk, II | | H04L 9/3242 |
| | | | | 707/827 |
| 2012/0330903 A1* | 12/2012 | Periyagaram | | G06F 3/067 |
| | | | | 707/692 |
| 2013/0110793 A1* | 5/2013 | Chavda | | G06F 7/00 |
| | | | | 707/692 |
| 2013/0179407 A1* | 7/2013 | Stoakes | | G06F 16/1752 |
| | | | | 707/692 |
| 2013/0339316 A1* | 12/2013 | Hirsch | | G06F 3/0689 |
| | | | | 707/692 |
| 2014/0074794 A1* | 3/2014 | Chavda | | G06F 11/1458 |
| | | | | 707/679 |
| 2014/0108732 A1* | 4/2014 | Hildebrand | | G06F 12/0895 |
| | | | | 711/122 |
| 2014/0114933 A1* | 4/2014 | Chandrasekarasastry | | |
| | | | | G06F 3/06 |
| | | | | 707/692 |
| 2014/0115258 A1* | 4/2014 | Week | | G06F 16/1752 |
| | | | | 711/133 |
| 2014/0149366 A1* | 5/2014 | Huang | | G06F 3/067 |
| | | | | 707/692 |
| 2014/0344216 A1* | 11/2014 | Abercrombie | | G06F 11/1448 |
| | | | | 707/609 |
| 2014/0365449 A1* | 12/2014 | Chambliss | | G06F 16/1752 |
| | | | | 707/692 |
| 2015/0301903 A1* | 10/2015 | Mutha | | G06F 11/1453 |
| | | | | 707/692 |
| 2016/0127307 A1* | 5/2016 | Jain | | G06F 3/0619 |
| | | | | 709/245 |
| 2016/0350324 A1* | 12/2016 | Wang | | G06F 16/2255 |
| 2017/0031830 A1* | 2/2017 | Bk | | G06F 3/0656 |
| 2017/0177867 A1* | 6/2017 | Crofton | | G06F 21/565 |
| 2017/0180394 A1* | 6/2017 | Crofton | | G06F 21/64 |
| 2017/0199674 A1* | 7/2017 | Delgado | | G06F 3/0608 |
| 2017/0208052 A1* | 7/2017 | Jai | | G06F 16/172 |
| 2017/0262465 A1* | 9/2017 | Goggin | | G06F 16/1748 |

* cited by examiner

FILE GRANULAR DATA DE-DUPLICATION EFFECTIVENESS METRIC FOR DATA DE-DUPLICATION

BACKGROUND

Eliminating redundant copies of data, commonly referred to as data de-duplication, is a service prevalent within storage area network servers, file systems, and volume/layout managers. Integrated file systems that also provide RAID and volume management services such as the ZFS file system and btrfs (B-tree file system) can control and monitor data de-duplication at a file level granularity while de-duplicating data across entire storage pools. It is more challenging, however, for a layered storage system to monitor or control volume management services such as data de-duplication at the granularity of a single file that resides in a file system whose backing storage is on a volume provided by the volume management layer.

SUMMARY

Embodiments in accordance with the present disclosure include a method in a distributed storage system having a plurality of storage volumes, the method may include storing a plurality of data files among the storage volumes. For each storage volume, data that comprise data files stored in that storage volume may be deduplicated. The method may further include computing uniqueness metrics for respective data files in their respective storage volumes. The uniqueness metrics may indicate a degree of deduplication of the respective data files. Using the uniqueness metrics of data files in a first storage volume, one or more first data files in the first storage volume may be identified and moved from the first storage volume to at least a second storage volume to load balance the data files among the storage volumes that comprise the distributed storage system.

Embodiments in accordance with the present disclosure include a non-transitory computer-readable storage medium having stored thereon computer executable instructions. When the computer executable instructions are executed by a computer device, the computer device may store a plurality of data files among storage volumes that comprise a distributed storage system. For each storage volume, data that comprise data files may be deduplicated. Uniqueness metrics may be computed for respective data files in a given storage volume. The uniqueness metrics may indicate of a degree of deduplication of the respective data files in the given storage volume. The uniqueness metrics of data files in a first storage volume may be used to identify a one or more first data files in the first storage volume. One or more first data files may be moved from the first storage volume to at least a second storage volume to load balance the data files among the storage volumes that comprise the distributed storage system.

Embodiments in accordance with the present disclosure include an apparatus comprising one or more computer processors, a distributed storage system comprising a plurality of storage volumes, and a computer-readable storage medium. The computer-readable storage medium may include instructions for controlling the one or more computer processors to store a plurality of data files among the storage volumes of the distributed storage system. The data that comprise data files may be deduplicated. Uniqueness metrics may be computed for respective data files in a given storage volume. The uniqueness metrics may indicate a degree of deduplication of the respective data files in the given storage volume. The uniqueness metrics of data files in a first storage volume may be used to identify a one or more first data files in the first storage volume. One or more first data files may be moved from the first storage volume to at least a second storage volume to load balance the data files among the storage volumes that comprise the distributed storage system.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
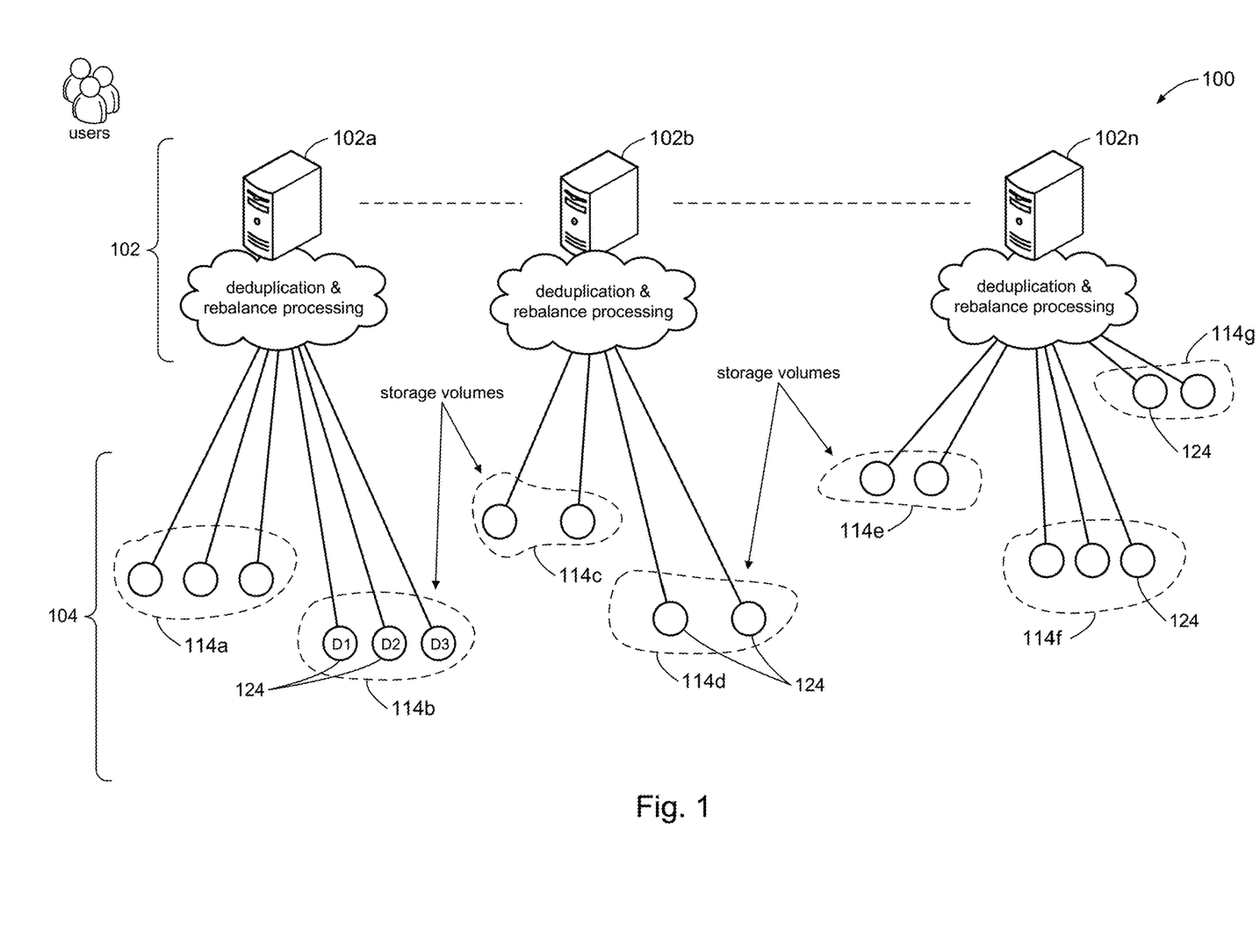
FIG. 1 shows an example of distributed storage system in accordance with the present disclosure.

FIG. 1 shows computing system 100 in accordance with aspects of the present disclosure. The computing system 100 may include a network of hosts 102. In some embodiments, for example, the network of hosts 102 may comprise hosts 102*a*, 102*b* to 102*n*. The hosts 102 may be interconnected by a suitable communication network (not shown).

The computing system 100 may comprise a distributed storage system 104. The distributed storage system 104 may be organized around any suitable storage architecture. For discussion purposes, the embodiment of FIG. 1 shows the distributed storage system 104 being organized as a plurality of storage volumes 114a-114g. Each storage volume 114a-114g, in turn, may be organized as a configuration of one (e.g., 114c) or more (e.g., 114d) data storage devices 124; e.g., hard disk drives. The figure shows a "flat" configuration of data storage devices 124, although in some embodiments, the data storage devices 124 in a given storage volume (e.g. 114a) may have any suitable storage organization; e.g., a layered (tiered, hierarchical) organization, etc.

In some embodiments, each host 102a, 102b, 102n may manage one or more of the storage volumes 114a-114g to provide storage services to users of the computing system 100. For example, host 102a manages and services requests for files (data files, objects, components, etc.) stored on storage volume 114a and for files stored on storage volume 114b. Files may be managed within the bounds of a given storage volume that they are stored on. For example, files stored on storage volume 114e can be distributed among the data storage devices 124 that comprise storage volume 114e, but not among data storage devices 124 that comprise another storage volume (e.g., 114f).

User, however, may view the distributed storage system 104 as one large logical storage system and may not recognize boundaries between the storage volumes 114a-114g. Users may access files stored in the distributed storage system 104 via any host 102a, 102b, 102n. The hosts 102 may coordinate with each other to provide users with access to a file irrespective of where in the distributed storage system 104 it is stored. For example, a user on host 102a may access files stored on storage volume 114f, which is managed by host 102n; the hosts 102a and 102n may coordinate with each other to provide the user with file services to access files stored on storage volume 114f.

In accordance with the present disclosure, hosts 102 may be configured to provide data deduplication of files to be stored on their respective storage volumes 114a-114g. In the context of data deduplication, a given storage volume defines the deduplication domain for deduplication processing. For example, files stored on storage volume 114b may be deduplicated on the data storage devices 124 that comprise storage volume 114b, namely D1, D2, AND D3, not data storage devices 124 in the other storage volumes. Moreover, deduplication of files on storage volume 114b would not involve data storage devices 124 in storage volume 114a, even though host 102a manages both storage volume 114a and storage volume 114b. Additional details of deduplication are discussed below.

Further in accordance with the present disclosure, hosts 102 may be configured to provide rebalance processing so that data is evenly distributed across the storage volumes 114a-114g of the distributed storage system 104; e.g., to improve data throughput. In some embodiments, rebalancing may occur across storage volumes 114a-114g, as compared to deduplication which occurs within a storage volume. Additional details for rebalance processing are disclosed below.

Figure 2:
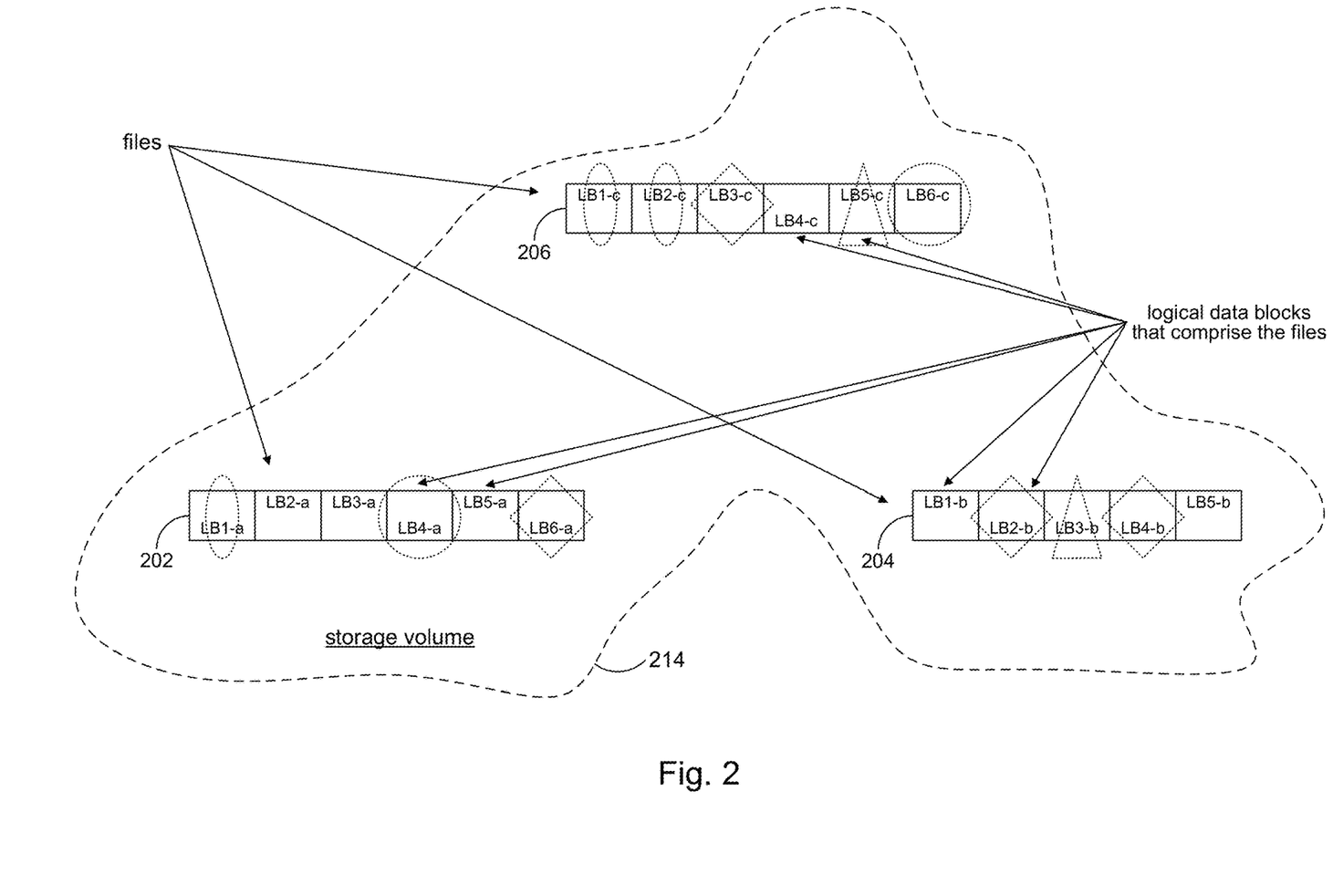
FIGS. 2 and 2A illustrate the process of data deduplication in accordance with the present disclosure.
Figure 2A:
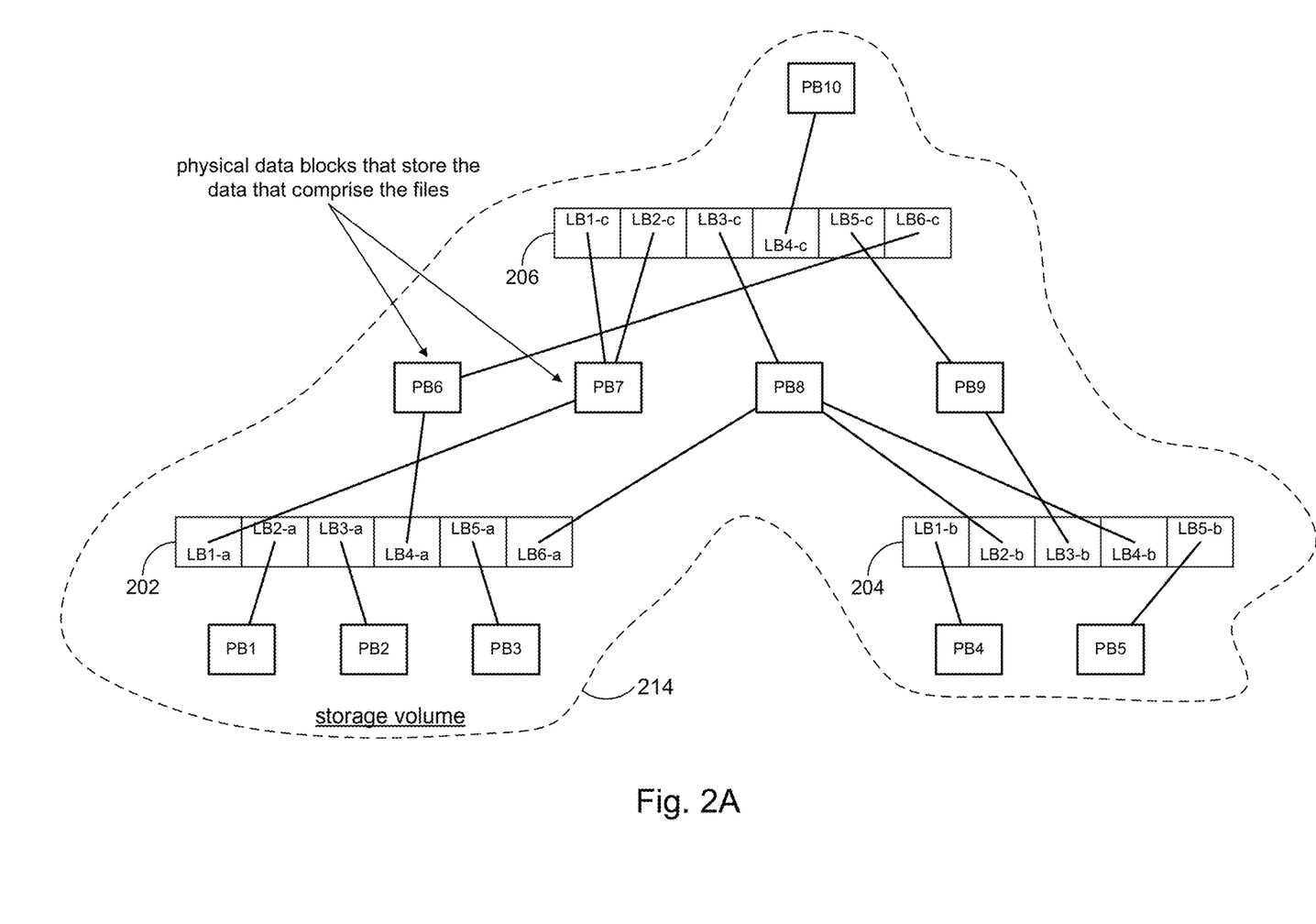

FIGS. 2 and 2A illustrate a high level description of details for deduplicated files. As noted above, in some embodiments the deduplication domain for a given file may be the storage volume that the given file is stored in. FIG. 2 shows details for files 202, 204, 206 stored on a storage volume 214. The data for each file 202-206 may be logically viewed as being stored in the file's respective set of logical data blocks. Thus, for example, the data for file 202 may be logically viewed as being stored in or otherwise associated with logical data blocks LB1-a-LB6-a. Likewise, logical data blocks LB1-b-LB5-b may logically hold or otherwise be associated with the data for file 204, and logical data blocks LB1-c-LB6-c may logically hold the data for file 206. This describes a logical, abstract view of files 202-206.

The "data" that belongs to a file should be distinguished from the "metadata" for that file. The data for a file refers to the information that is the reason for having the file in the first place; the file serves to identify the data. By contrast, the metadata for a file serves only to describe attributes about the file; e.g., creation date, access privileges, size of the file, and so on. If the data did not exist, then there would be no file, and without a file there would be no reason to have the metadata.

Continuing with FIGS. 2 and 2A, consider now the physical view of files 202-206. For explanation purposes, the following assumptions may be made, without loss of generality, about the data that comprise files 202-206. Referring to FIG. 2, suppose the data in the logical data blocks of files 202 and 206 that are circled by the oval shape are identical. In other words, the data in LB1-a of file 202 is the same as the data in LB1-c of file 206, which is the same as the data in LB2-c of file 206. Likewise, suppose the data in the logical data blocks circled by the circle shape are identical, and so on with data in the logical data blocks circled by the triangle shape and by the diamond shape. Data in the logical data blocks that are not circle at all are assumed to be unique among the logical data blocks of files 202-206.

The data that comprise files 202-206 may be stored in physical data blocks of the data storage devices (e.g., 124, FIG. 1) that comprise the storage volume 214. In some implementations, one or more physical data blocks may be necessary to physically store the data in one logical data block. For discussion purposes, however, we can assume that one physical data block can store the data in one logical data block.

The data that comprise files 202-206 shown in FIG. 2 may be deduplicated. At a high level, data deduplication processing may proceed as follows. Consider, for example, a file to be stored within the storage space of a deduplication domain (e.g., on storage volume 114a, FIG. 1). For data in a given logical data block of that file, if that data is not already stored in a previously allocated physical data block, then that data is unique within the deduplication domain. A new physical data block may be allocated, and the data may be stored in the newly allocated physical data block. The given logical data block may then be associated with the newly allocated physical data block. On the other hand, for data that is already stored in a previously allocated physical data block, then that data may be considered duplicate data within the deduplication domain. Accordingly, the given logical data block is simply associated with that previously allocated physical data block.

FIG. 2A illustrates an example of deduplication of the files 202, 204, 206 in FIG. 2. For example, the data logically stored in LB1-a, LB2-a, LB3-a, LB4-a, LB5-a, and LB6-a of file 202 are physically stored in respective physical data blocks PB7, PB1, PB2, PB6, PB3, and PB8. A similar association or mapping can be seen between the logical and physical data blocks for files 204 and 206. Per the assumptions made above, the data stored in physical data blocks PB1-PB5 and PB10 store unique data, and may be referred to as "unique" physical data blocks because these physical data blocks are not shared by other files.

On the other hand, the data stored in physical data block PB6 is shared by LB4-a of file 202 and LB6-c of file 206. Physical data block PB6 may be regarded as being shared by files 202 and 206. PB6 is said to be "deduplicated" because, without file deduplication, two physical data blocks would have been allocated to store data that identically occurs in files 202 and 206, one physical data block for each file 202, 206. Physical data blocks PB7-PB9 are likewise deduplicated, shared physical data blocks. Physical data block PB7 illustrates an example that duplicate data may occur within the same file; e.g., FIG. 2A shows that LB1-c and LB2-c of file 206 logically store identical data. Accordingly, LB1-b and LB2-b of file 204 are associated with the same physical data block, namely PB7.

It can be seen in FIG. 2A that deduplication can reduce the physical storage requirements of a file system. The files 202-206 require sixteen logical data blocks. In a non-deduplicated storage system, the files 202-206 would consume sixteen physical data blocks of physical storage. By comparison, the deduplication example illustrated in FIG. 2A shows that deduplication of files 202-206 can result in fewer physical data blocks, in this case ten physical data blocks.

The discussion will now turn to rebalancing. Over time, the distribution of files in a storage system may become uneven. Referring to FIG. 1, for example, storage utilization in the distributed storage system 104 may become unevenly distributed across the storage volumes 114a-114g; e.g., some storage volumes may become more utilized than other storage volumes. This can result in poor throughput performance in those storage volumes that have higher utilization than in storage volumes that are less utilized. Rebalancing is a technique used to move files within the storage system in order to more evenly distribute storage utilization in the storage system. For example, rebalancing may be performed across the storage volumes 114a-114g (FIG. 1) that comprise the distributed storage system 104.

Figure 3:
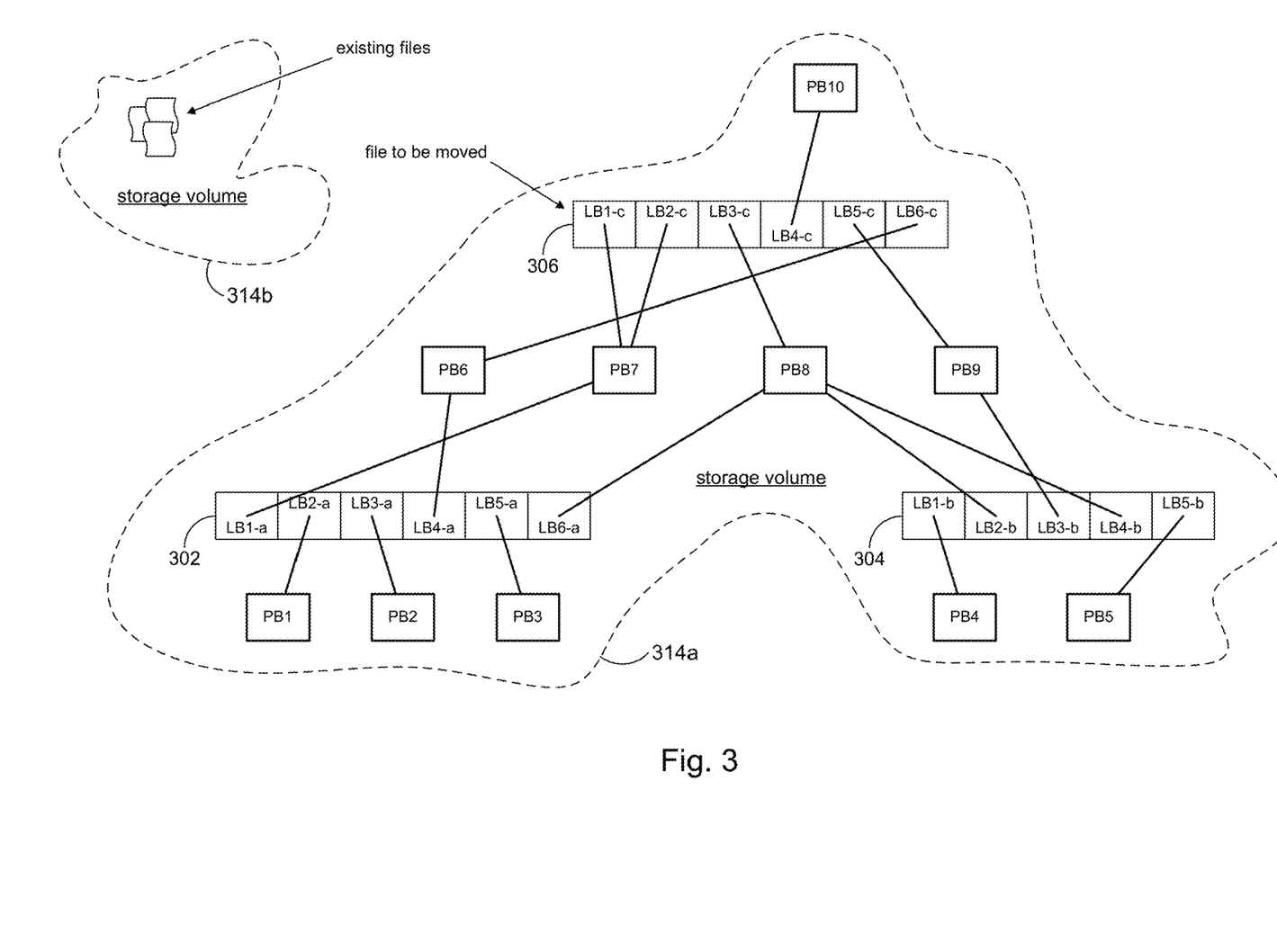
FIGS. 3 and 3A illustrate data deduplication in a rebalancing environment in accordance with the present disclosure.

In accordance with the present disclosure, rebalancing may involve moving files from one storage volume to another storage volume in the distributed storage system 104. However, rebalancing a deduplicated file can be ineffective. Consider, for example, the configuration of files shown in FIG. 3. The figure shows two storage volumes 314a, 314b. Storage volume 314a may contain files 302, 304, 306 having the same configuration of logical data blocks and physical data blocks as illustrated in FIG. 2. Although not shown, storage volume 314b will be understood to have its own set of files and its own set of allocated physical data blocks, some shared, some unique (unshared). Suppose that all the data in file 306 is unique among all the data in storage volume 314b.

Figure 3A:
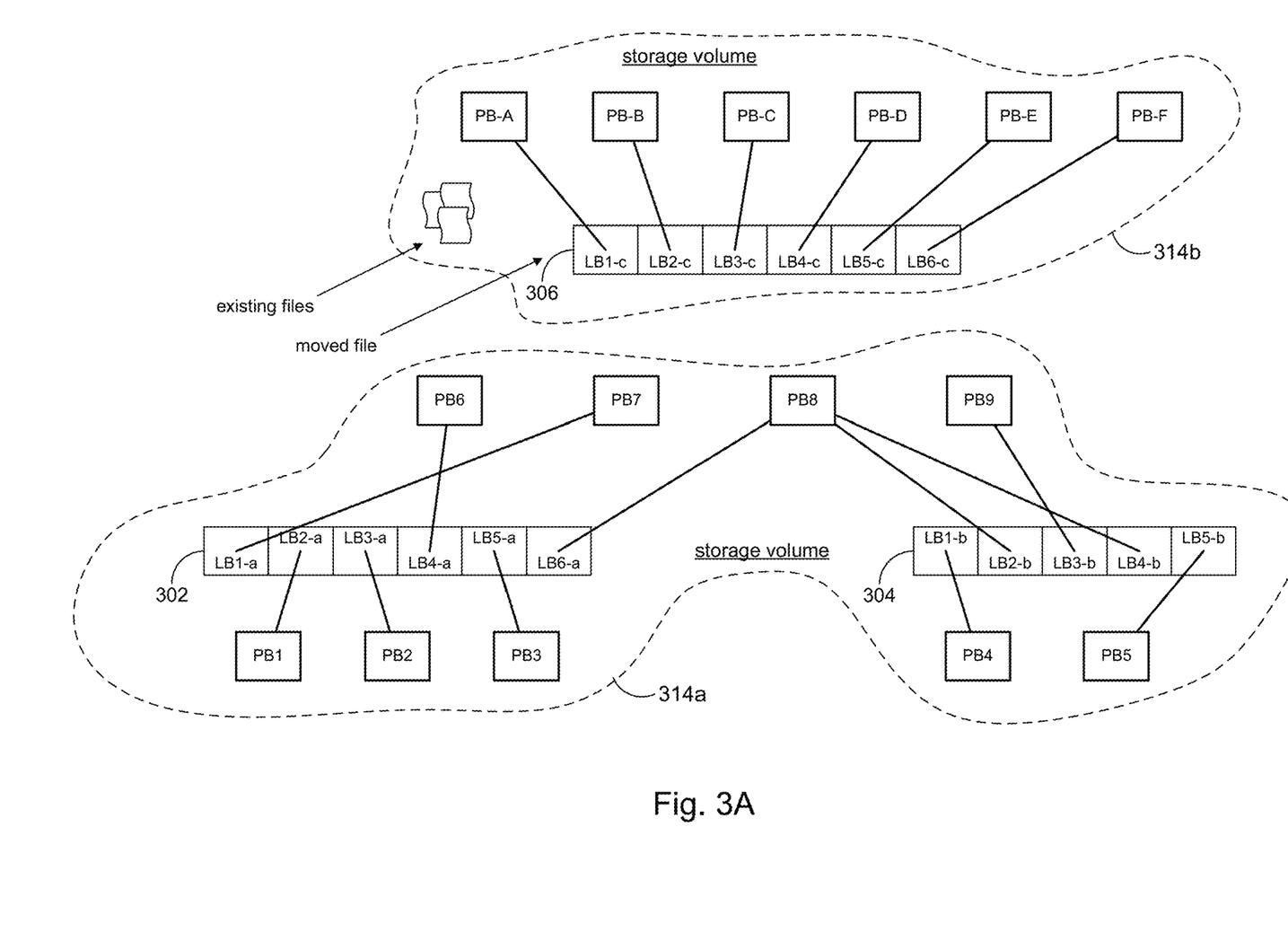

FIG. 3A shows the result of moving file 306 from storage volume 314a to storage volume 314b, for example as a result of rebalance processing. Consider how the storage consumption in storage volume 314a has changed between FIG. 3 and FIG. 3A. Only physical data block PB9 was unique to file 306 (FIG. 3) in storage volume 314a. Accordingly, moving file 306 out of storage volume 314a may result in one physical data block being de-allocated and returned to the free space of storage volume 314a. The storage utilization in storage volume 314a is reduced by one physical data block. Consider, next, how the storage consumption in storage volume 314b has changed between FIG. 3 and FIG. 3A, as a result of the rebalancing. Since we assume that the data in file 306 is unique to storage volume 314b, then new physical data blocks, namely PB-A to PB-F, would be allocated in storage volume 314b to store file 306. It can be appreciated that in this situation, moving file 306 was not effective in rebalancing: only one physical data block of space was recovered in storage volume 314a, and it was at the cost of consuming six physical data blocks in storage volume 314b.

Figure 4A:
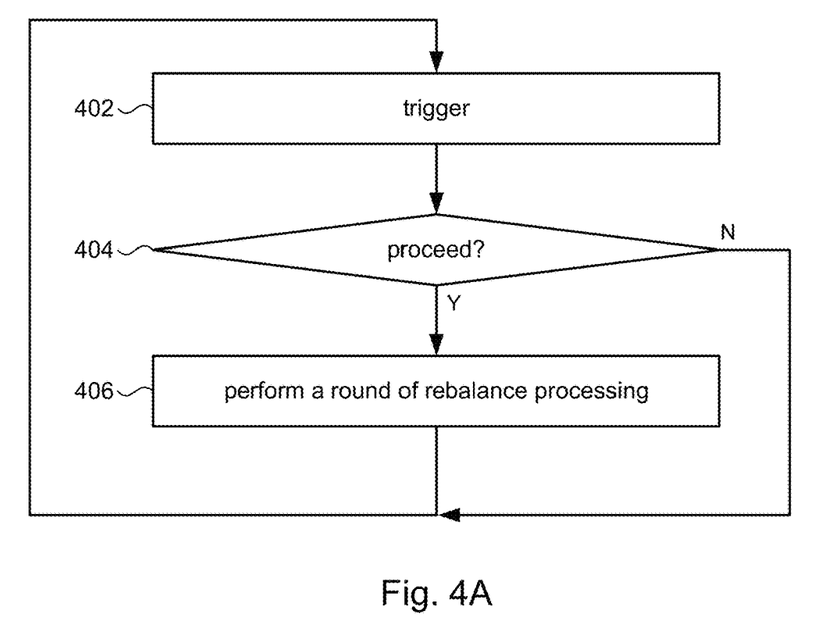
FIGS. 4A and 4B illustrate rebalance processing in accordance with the present disclosure.
Figure 4B:
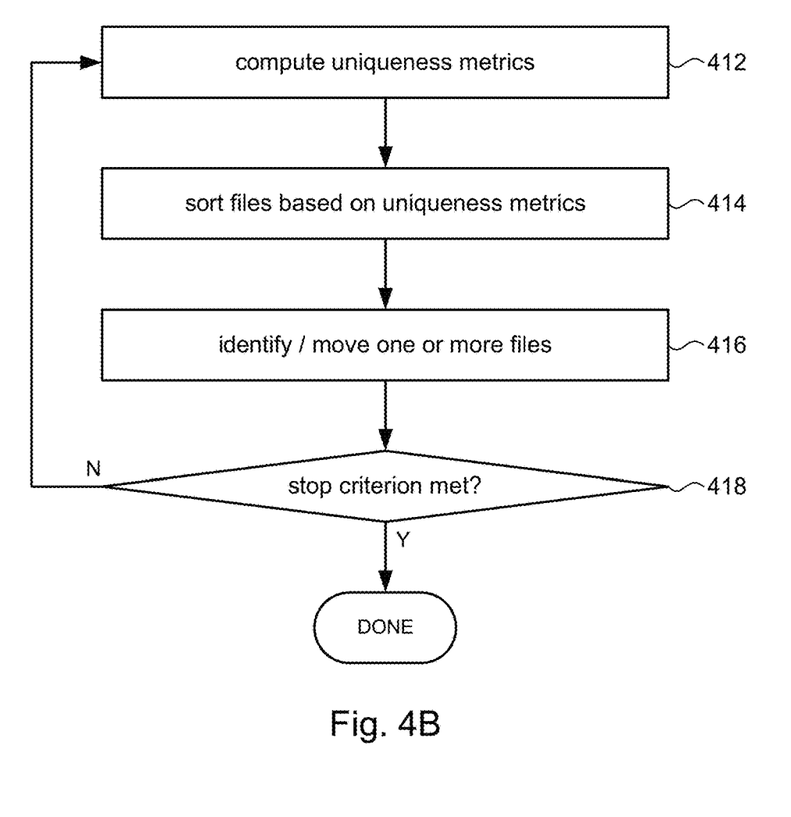

With reference to FIGS. 4A and 4B, the discussion will now turn to a description of rebalance processing in accordance with the present disclosure. Rebalance processing will be described in the context of the computing system 100 shown in FIG. 1. In some embodiments, each host 102a, 102b, 102n may perform rebalance processing on files stored in the storage volume 114a-114g managed by that host. For example, host 102a may manage rebalance processing of files contained in storage volume 114a. Host 102a may also manage rebalance processing of files contained in storage volume 114b. Host 102b may manage rebalance processing of files in storage volume 114c, and so on.

In some embodiments, rebalance processing may involve moving files from a source storage volume (e.g., 114a) to a destination storage volume (e.g., 114d). For example, if host 102a identifies a file in storage volume 114b (the source), host 102a may then identify a destination storage volume from among the remaining storage volumes 114a, 114c-114g in the distributed storage system 104 to move the file to.

In some embodiments, rebalance processing among hosts 102 may occur asynchronously of each other. In other embodiments, rebalance processing in a given host (e.g., 102a) may involve coordinating with some or all the other hosts 102. In still other embodiments, rebalance processing may involve interaction with a user, such as a system administrator.

Rebalance processing in a given host (e.g., 102a) will now be described with reference to FIG. 4A. At block 402, a trigger may occur in the host to initiate rebalance processing. In some embodiments, for example, rebalance processing may occur on a timed basis; e.g., rebalance processing may be scheduled to occur at certain times (e.g., during the day, day of week, monthly, etc.). Rebalance processing may be event-driven. For example, when the storage volume (e.g., 114a, FIG. 1) managed by the host exceeds a predetermined threshold of storage utilization, that may be an event that triggers rebalance processing by the host. The event may be less local; for example, if the average storage utilization among two or more storage volumes exceeds a predetermined level, that may be an event that triggers rebalance processing, and so on. In some embodiments, rebalance processing may be triggered by a user; e.g., a system administrator may initiate rebalance processing among one or more storage volumes 114a-114g.

At block 404, when rebalance processing is triggered, a determination may be made whether to proceed with rebalance processing. It will be apparent that rebalance processing can be a resource intensive process. Since the movement of files is involved, rebalance processing can interfere with actual users of the system. Accordingly, the determination made at block 404 may be based on whether storage utilization in the distributed storage system 104 merits rebalance processing. If the triggering event at block 402 is based on one or more storage utilization criteria (e.g., capacity has reached a certain level), then by definition rebalance processing may be appropriate and processing may proceed to block 406. On the other hand, if the triggering event is a timer event, a user initiated event, or some other non-utilization based event, then an assessment of storage utilization in the distributed storage system 104 may be appropriate to decide whether to perform rebalance processing or not. If it is determined that rebalance processing should not be performed at this time, then processing may return to block 402 to wait for the next trigger; otherwise processing may proceed to block 406.

At block 406, if rebalance processing was deemed appropriate at block 404, then in accordance with some aspects of the present disclosure a round of rebalance processing may be performed, see FIG. 4B. Upon completion of a round of rebalance processing, processing may return to block 402 to wait for the next trigger.

Referring to FIG. 4B, a brief high level description of rebalance processing will be given. The description will then be followed by a more detailed description. In some embodiments, rebalance processing may occur for files within a "source" storage volume (e.g., 114a, FIG. 1). At block 412, a uniqueness metric may be computed in accordance with the present disclosure for each file in the source storage volume. At block 414, the uniqueness metric computed for each file may be used as a basis for sorting or otherwise ordering the files into a list. At block 416, one or more files may be identified from the list of sorted files. The one or more identified files may then be moved from the source storage volume to a destination storage volume. At block 418 a determination is made whether a stop criterion has been met. If the stop criterion has not been met, then processing may proceed to block 412 for another iteration. If the stop criterion has been met, the processing may complete.

Figure 5A:
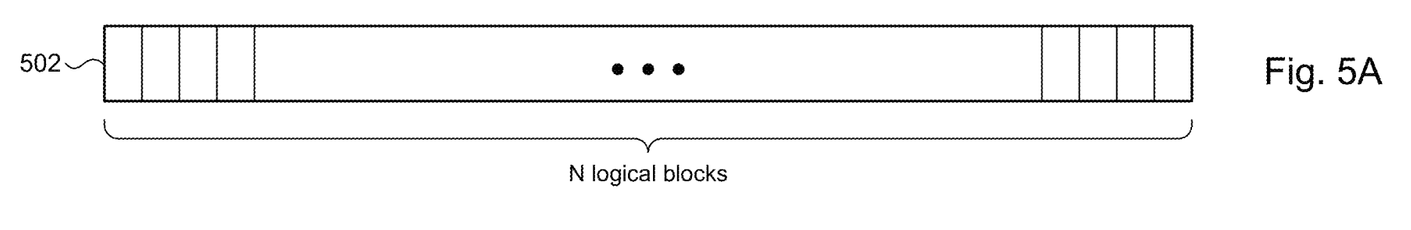
FIGS. 5A, 5B, 5C illustrate embodiments for computing a uniqueness metric in accordance with the present disclosure.
Figure 5B:
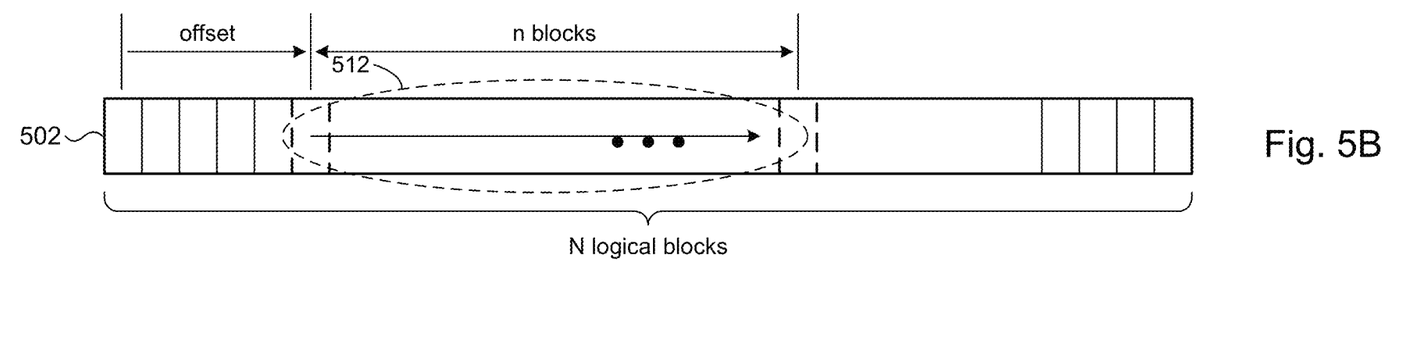
Figure 5C:
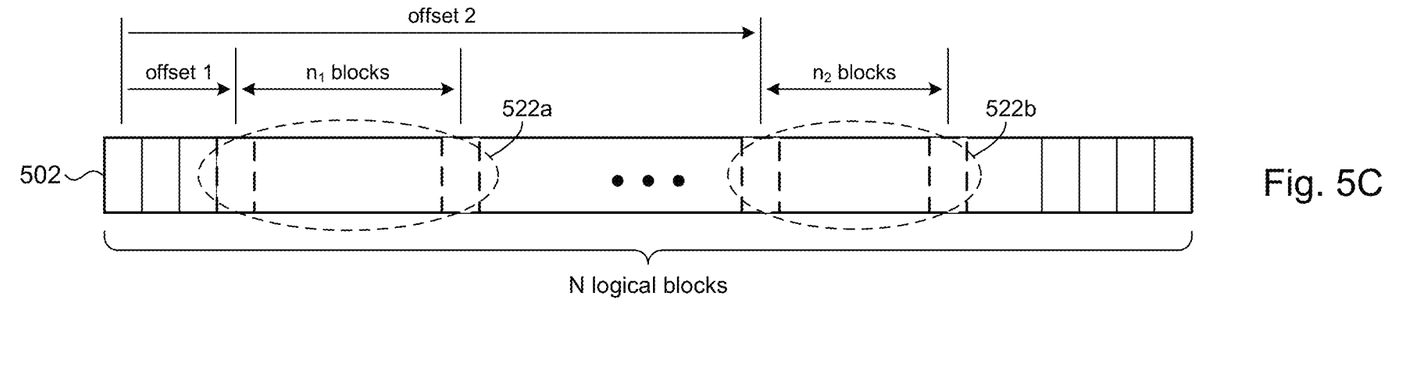

The discussion will now turn to a more detailed description of processing in block 412 in accordance with the present disclosure, with reference to FIGS. 5A, 5B, 5C. At block 412, a uniqueness metric for a given file may be computed. The uniqueness metric of a file may represent the file's storage efficiency. Stated differently, the uniqueness metric may indicate the effectiveness of a file's deduplication. In some embodiments, for example, the uniqueness metric may be computed as a ratio of the number of logical data blocks in the file that point to unique physical data blocks to the number of logical data blocks that comprise the file. Referring to FIG. 5A, for example, suppose a file 502 has a total of N logical data blocks. Suppose further that M of those logical data blocks point to unique physical data blocks. In some embodiments, the uniqueness metric may be computed as $$\frac{M}{N}.$$

A uniqueness metric of 1 means none of the blocks of data in file 502 exist in other files; file 502 may be said to be maximally unique. Another way to interpret a uniqueness metric of 1 may be that data deduplication was not at all effective at reducing the additional storage needed to store file 502. At the other end of the range, a uniqueness metric of 0 may be interpreted as each block of data in the file 502 exists in other files; data deduplication was 100% effective and resulted in no additional storage needed to store file 502. In practice, the value of the uniqueness metric is likely to lie between 1 (deduplication was 0% effective) to 0 (deduplication was 100% effective). In other embodiments, the uniqueness metric may be computed as the complimentary ratio $$1 - \frac{M}{N}.$$

A value of 1 could be viewed as data deduplication being 100% effective, while a value of 0 could be viewed as data deduplication being 0% effective.

In some embodiments, the range of the uniqueness metric for a file may be expressed in normalized form from 0% to 100%, by multiplying the ratio by 100. In other embodiments, the range of the uniqueness metric may be expressed in normalized form from 1% to 99%, reserving the extreme values 0% and 100% for special uses. For example, in an embodiment, the value of 100% may indicate de-duplication is not supported for the file, and the value of 0% may indicate that the uniqueness metric has not yet been computed for the file.

FIG. 5A shows a file 502. Suppose the number of logical blocks that constitute the file 502 is N. In some embodiments, an exact value of the uniqueness metric for file 502 may be computed by taking into account the shared or unshared state of the data in each of the N logical data blocks that constitute the file 502 (referred to as a full scan). However, considering every logical data block in a file may not be practical. For example, in a given computing system the number of files in the system and the file sizes may be large, consisting of many thousands of files, each file consisting of many tens of thousands of logical data blocks. In such a system, computing a full scan type of uniqueness metric for every file can become unacceptably resource intensive. Accordingly, in some embodiments, a subset of the blocks may be used for the calculation as is further described in FIG. 5B.

Referring to FIG. 5B, in some embodiments, a random sampling 512 of the logical data blocks of file 502 may be taken. For example, in some embodiments, a randomly selected offset into the file 502 may be selected. In other embodiments, the offset may be determined some other way; for example, the offset into any file may be a fixed value, the offset may be specified in the metadata for the file, etc. When the offset is determined, some number n of logical data blocks (the sample size), beginning from that offset, may be used to compute the uniqueness metric (referred to as a partial scan). Suppose the sample size is n logical data blocks, and m of those logical data blocks point to unique physical data blocks. The uniqueness metric may be computed as $$\frac{m}{n}.$$

In some embodiments, the sample size n may be randomly selected. In other embodiments, the sample size n may be determined in other ways; for example, the sample size n may depend on the size of the file 502 (e.g., a larger value of n for a larger file, a smaller value of n for a smaller file), the sample size n may be included in the metadata for that file, and so on. Merely to illustrate the point further, a fixed sample size can be picked, regardless the size of the file. According to some calculation based on the formula of Chernoff bound, for example, if a sample size of 20,000 logical blocks is picked, there is a high probability that the calculated uniqueness metric can be within 2% of true uniqueness metric without sampling. This means that the estimate of how many blocks is unique in a file is likely to be off only within a small error margin, namely 2% of the file size. The probability that the estimate is off by more than 2% can be computed as e^(-20000*0.0008)=~1e-7.

Referring to FIG. 5C, in some embodiments, two or more random samples 522a, 522b of logical data blocks may be taken. Each random sample 522a, 522b may be taken, for example, by randomly selecting an offset (offset 1, offset 2)

into the file 502 and selecting some number $n_1$, $n_2$ of logical data blocks beginning from that offset. The samples 522a, 522b may have the same sample size ($n_1=n_2$), or different sample sizes ($n_1 \neq n_2$). The computed uniqueness metric for each sample 522a, 522b may be aggregated (e.g., summed, weighted sum, etc.) to produce a composite uniqueness metric.

Figure 6:
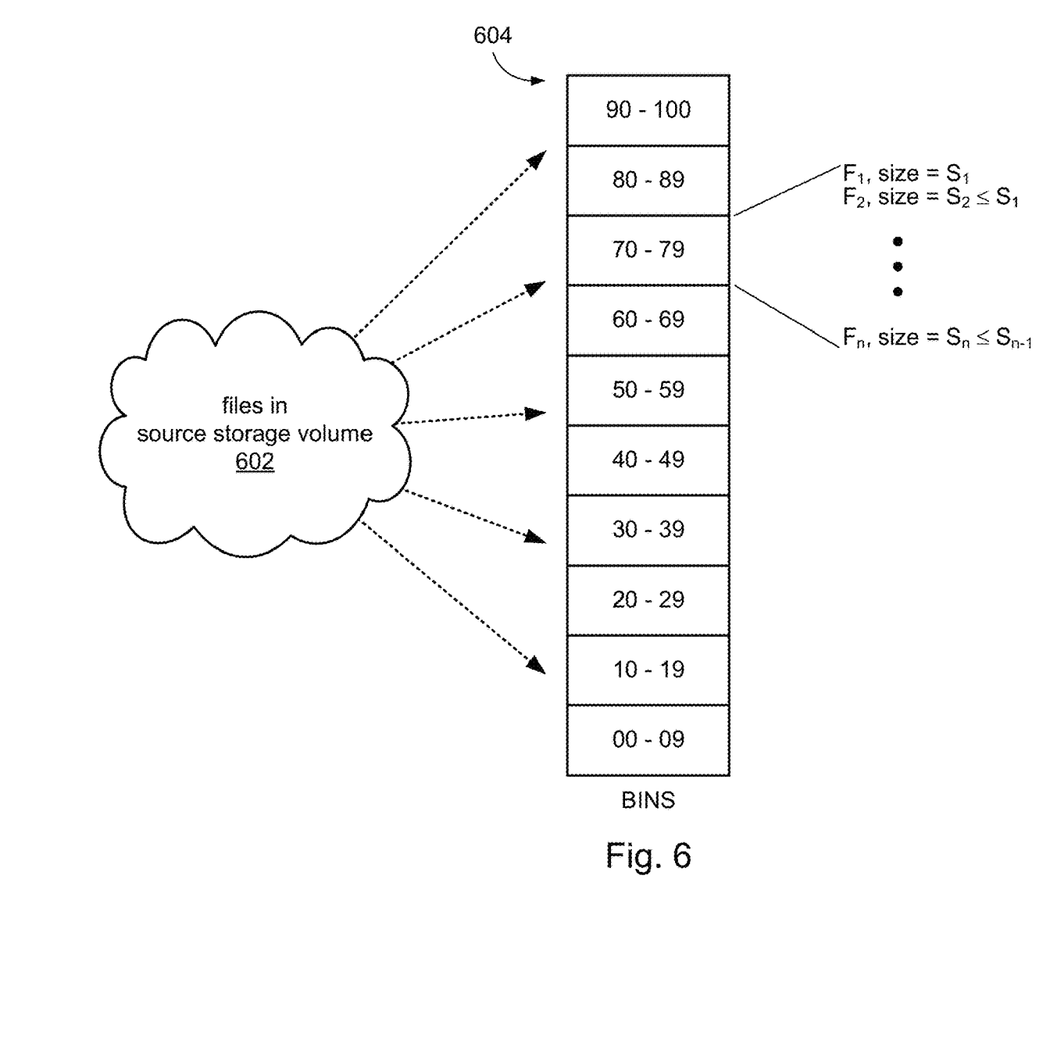
FIG. 6 shows binning of the uniqueness metrics of a files in a given deduplication domain.

The discussion will now turn to a more detailed description of processing in block 414 in accordance with the present disclosure. At block 414, the files may be sorted according to their respective uniqueness metrics. Referring to FIG. 6, in some embodiments, the files 602 in a source storage volume (e.g., 114a, FIG. 1) may be binned according to their uniqueness metric (e.g., expressed as percentages) into a set of bins 604 (buckets). The bins 604 may divided into equal sized buckets. FIG. 6, for example, shows ten equal sized buckets, each bucket representing a range of about 10%. In some embodiments, the bins 604 may comprise more of fewer buckets. In some embodiments, the buckets may represent different sized ranges.

As shown in FIG. 6, files having uniqueness metrics in the range from 90-100% may be binned in the bucket identified as 90-100, files having a uniqueness metric in the range from 80-89% may be binned in the bucket identified as 80-89, and so on. Files within a given bucket may be sorted according to their file size, for example, from smallest to largest.

Figure 7:
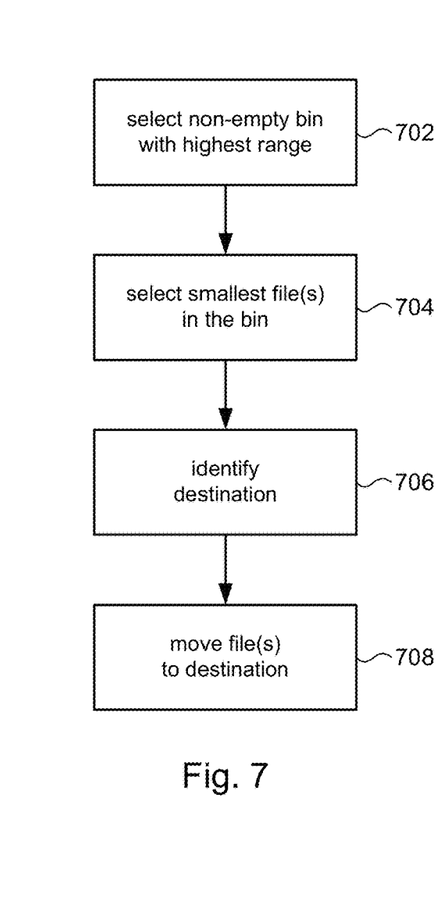
FIG. 7 shows rebalance processing in accordance with the present disclosure.

The discussion will now turn to a more detailed description of processing in block 416 in accordance with the present disclosure. At block 416 one or more files to be moved from the source storage volume may be identified from the binning shown in FIG. 6. Referring to FIG. 7, at block 702 one or more files may be selected from the non-empty bin that stores the highest range of uniqueness metrics. For purposes of explanation, suppose a single file is to be selected.

At 704, the smallest file in that bin may be selected as the file to be moved to a destination storage volume. Selecting the smallest file to be moved first can reduce the impact of the rebalance process on the destination storage volumes. A smaller file may improve the chance of a successful move; e.g., a smaller file is more likely to find a destination when the distributed storage system 104 is operating near capacity.

At block 706, selection of the destination storage volume, in accordance with some embodiments, may be made by assuming that there will be zero deduplication of the selected file at the destination storage volume. In accordance with the present disclosure, the source storage volume and the destination storage volume are different from each other. A storage volume that has capacity to store the selected file with zero deduplication may serve as the destination storage volume. The assumption of zero deduplication can guarantee that the selected storage volume has sufficient available storage capacity to store the selected file. As another consideration, a storage volume that can provide a higher degree deduplication than the source volume may serve as the destination volume.

In other embodiments, additional or other factors may be used to select the destination storage volume. For example, the nature of the data being moved may restrict the list of available destination storage volumes, security considerations may be involved, access permissions, and so on. Alternatively, a policy may dictate that the data be stored on a storage tier having specific performance characteristics. For example, the policy may dictate that some data must be stored in the flash storage tier. When there are several candidate destination storage volumes, these additional considerations may be used in conjunction with the calculated deduplication metric to choose the destination.

At block 708 the selected file may be moved from the source storage volume to the selected destination storage volume. In some embodiments, when a file is "moved" from a source storage volume to a destination storage volume, data in the source storage volume that is unique in the destination storage volume may be copied to physical data blocks allocated in the destination storage volume. Data in the source storage volume that is duplicated in the destination storage volume may deduplicated as discussed above. The physical data blocks in the source storage volume may then be de-allocated for data that was unique. For data in the source storage volume that was deduplicated, the physical data blocks remain allocated since the data still belongs to other files in the source storage volume. In some embodiments, a reference count associated with each shared physical data block in the source storage volume may be decremented by one to indicate there is at least one less logical data block associated with it. It will be appreciated that the selected file, in its new destination, may a different uniqueness metric. This fact will be taken into account at block 412 (FIG. 4B) when it uniqueness metric is computed when a round of rebalance processing takes place in the destination storage volume.

The discussion will now turn to a more detailed description of processing in block 418 in accordance with the present disclosure. At block 418, an assessment of storage utilization in the distributed storage system 104 may be made to determine whether to continue the current round of rebalance processing. In some embodiments, the criterion to end rebalance processing may be that the available capacity in the source storage volume has exceeded a threshold. In other words, enough files have been moved out of the source storage volume that the amount of free storage has exceeded a predetermined threshold. Other criteria may be more global. For example, the average available capacity among two or more storage volumes may serve as a criterion to end the current round of rebalance processing. In other embodiments, a timer may serve to terminate rebalance processing, recalling that the process can be resource intensive and thus can affect users on the system.

Figure 8:
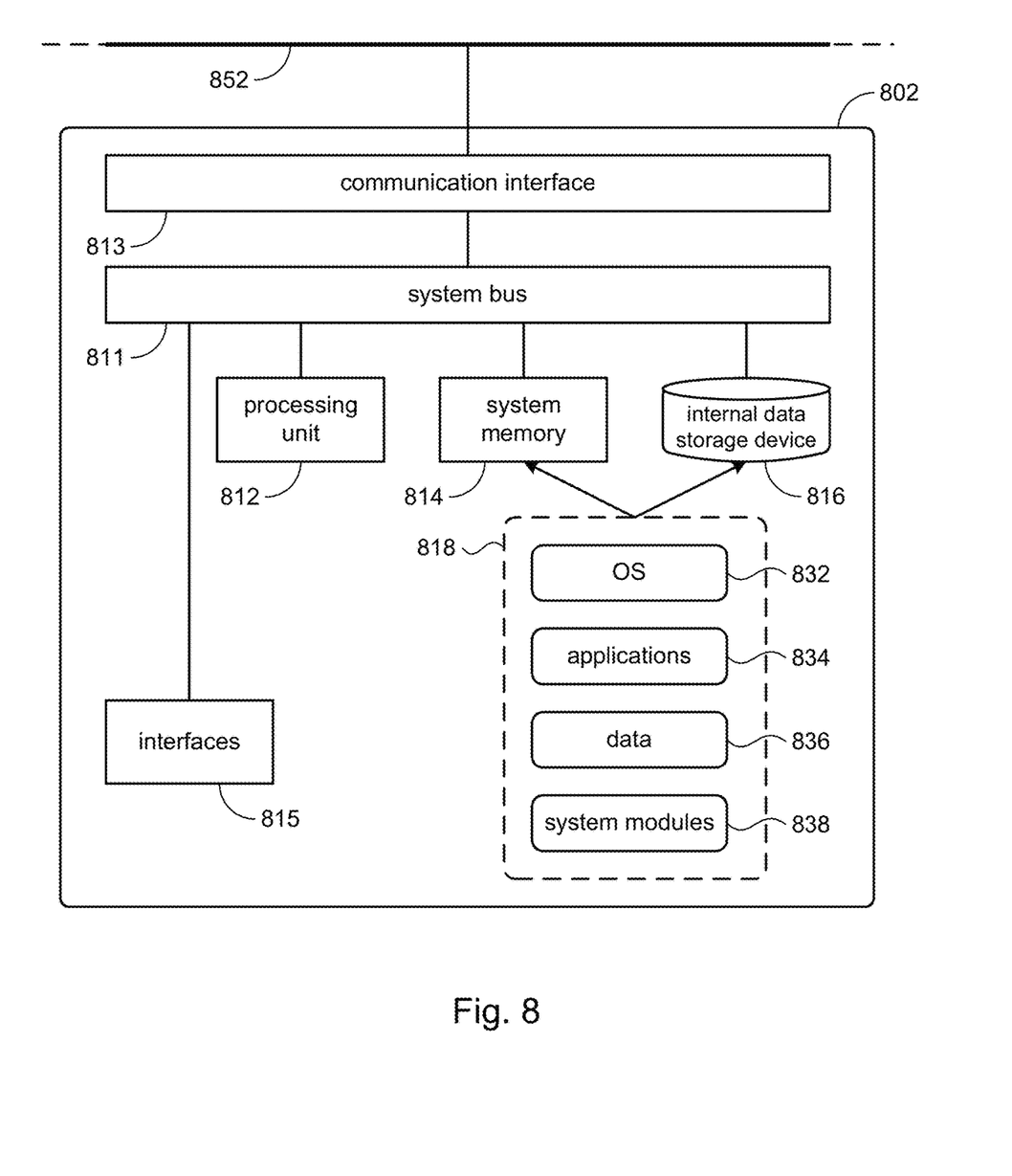
FIG. 8 shows an example of a host in accordance with the present disclosure.

Referring to FIG. 8, an illustrative implementation of a host (e.g., 102a) may include a computer system 802 having a processing unit 812, a system memory 814, and a system bus 811. The system bus 811 may connect various system components including, but not limited to, the processing unit 812, the system memory 814, an internal data storage device 816, and a communication interface 813.

The processing unit 812 may comprise a single-processor configuration, or may be a multi-processor architecture. The system memory 814 may include read-only memory (ROM) and random access memory (RAM). The internal data storage device 816 may be an internal hard disk drive (HDD), a solid state drive (SSD), a flash drive, or other non-volatile storage device (e.g., NVRAM, 3D xPoint, or other non-volatile storage technology), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 816 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 814 and/or the internal data storage device 816 may store a number of program modules, including an operating system 832, one or more application programs 834, program data 836, and other program/system modules 838. For example, in a computer system 802 configured as host 102a, the application programs 834, which when executed, may cause the computer system 802 to perform rebalance processing in accordance with the present disclosure (e.g., FIGS. 4A, 4B).

The computer system 802 may operate in a networked environment using logical connections via wired and/or wireless communications to one or more remote computers (not shown) over a communication network 852. The communication network 852 may be a local area network (LAN) and/or larger networks, such as a wide area network (WAN).

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a distributed storage system comprising a plurality of storage volumes, the method comprising:
    storing a plurality of data files among the storage volumes that comprise the distributed storage system including, for each storage volume, deduplicating data that comprise data files stored in that storage volume;
    scanning at least a portion of logical data blocks of the plurality of data files to determine a shared or unshared state for the at least the portion of logical data blocks in their respective storage volume, wherein the shared or unshared state is based on whether a physical data block for a first logical data block is shared by a second logical data block;
    computing uniqueness metrics for respective data files in their respective storage volume based on the scanning of respective logical data blocks and the shared or unshared state of the respective logical data blocks in the respective data files, the uniqueness metrics being indicative of a degree of deduplication of the respective data files in their respective storage volume;
    using the uniqueness metrics of data files in a first storage volume to identify one or more first data files in the first storage volume to move to another storage volume, wherein one or more second data files in the plurality of data files that are not identified remain in the first storage volume; and moving the one or more first data files from the first storage volume to a second storage volume to load balance the data files among the storage volumes that comprise the distributed storage system.

2. The method of claim 1, wherein computing a uniqueness metric for a given data file includes computing a ratio of a number of logical data blocks of the given data file that point to unique physical data blocks to a number of logical data blocks that comprise the given data file.

3. The method of claim 2, further comprising selecting a subset of the logical data blocks that comprise the given data file and determining a ratio of a total number of logical data blocks in the subset that point to unique physical data blocks to a total number of logical data blocks in the subset.

4. The method of claim 1, wherein computing a uniqueness metric for a given data file comprises selecting one or more subsets of the logical blocks that comprise the given data file and computing a uniqueness metric based on only the one or more subset of the logical blocks selected.

5. The method of claim 1, wherein the one or more first data files are further identified based on a target amount of data to be reduced in the first storage volume.

6. The method of claim 1, wherein using the uniqueness metrics to identify the first plurality of data files includes binning the data files in the first storage volume into a plurality of bins according to their respective uniqueness metrics, each bin associated with a range of uniqueness metrics, wherein the one or more first data files are initially identified from a first bin that is associated with the highest range of uniqueness metrics.

7. The method of claim 6, wherein the one or more first data files are the smallest among data files binned in the first bin.

8. The method of claim 6, wherein the one or more first data files are subsequently identified from bins associated with successively smaller ranges of uniqueness metrics.

9. The method of claim 1, further comprising:

using the uniqueness metrics of data files in the first storage volume to identify one or more third data files in the first storage volume to move to a third storage volume.

10. A non-transitory computer-readable storage medium having stored thereon computer executable instructions, which when executed by a computer device, cause the computer device to:

store a plurality of data files among storage volumes that comprise a distributed storage system including, for each storage volume, deduplicating data that comprise data files stored in that storage volume;

scan at least a portion of logical data blocks of the plurality of data files to determine a shared or unshared state for the at least the portion of logical data blocks in their respective storage volume, wherein the shared or unshared state is based on whether a physical data block for a first logical data block is shared by a second logical data block;

compute uniqueness metrics for respective data files in their respective storage volume based on the scanning of respective logical data blocks and the shared or unshared state of the respective logical data blocks in the respective data files, the uniqueness metrics being indicative of a degree of deduplication of the respective data files in their respective storage volume;

use the uniqueness metrics of data files in a first storage volume to identify one or more first data files in the first storage volume to move to another storage volume, wherein one or more second data files in the plurality of data files that are not identified remain in the first storage volume; and move the one or more first data files from the first storage volume to a second storage volume to load balance the data files among the storage volumes that comprise the distributed storage system.

11. The non-transitory computer-readable storage medium of claim 10, wherein the uniqueness metric for a given data file is computed by computing a ratio of a number of logical data blocks of the given data file that point to unique physical data blocks to a number of logical data blocks that comprise the given data file.

12. The non-transitory computer-readable storage medium of claim 11, further comprising computer executable instructions, which when executed by a computer device, cause the computer device to select a subset of the logical data blocks that comprise the given data file and determine a ratio of a total number of logical data blocks in the subset that point to unique physical data blocks to a total number of logical data blocks in the subset.

13. The non-transitory computer-readable storage medium of claim 10, wherein the uniqueness metric for a given data file is computed by selecting one or more subsets of the logical blocks that comprise the given data file and computing a uniqueness metric based on only the one or more subset of the logical blocks selected.

14. An apparatus comprising:

one or more computer processors;

a distributed storage system comprising a plurality of storage volumes; and a computer-readable storage medium comprising instructions for controlling the one or more computer processors to:

store a plurality of data files among storage volumes that comprise a distributed storage system including, for each storage volume, deduplicating data that comprise data files stored in that storage volume;

scan at least a portion of logical data blocks of the plurality of data files to determine a shared or unshared state for the at least the portion of logical data blocks in their respective storage volume, wherein the shared or unshared state is based on whether a physical data block for a first logical data block is shared by a second logical data block;

compute uniqueness metrics for respective data files in their respective storage volume based on the scanning of respective logical data blocks and the shared or unshared state of the respective logical data blocks in the respective data files, the uniqueness metrics being indicative of a degree of deduplication of the respective data files in their respective storage volume;

use the uniqueness metrics of data files in a first storage volume to identify one or more first data files in the first storage volume to move to another storage volume, wherein one or more second data files in the plurality of data files that are not identified remain in the first storage volume; and move the one or more first data files from the first storage volume to a second storage volume to load balance the data files among the storage volumes that comprise the distributed storage system.

15. The apparatus of claim 14, wherein computing a uniqueness metric for a given data file includes computing a ratio of a number of logical data blocks of the given data file that point to unique physical data blocks to a number of logical data blocks that comprise the given data file.

16. The apparatus of claim 14, further comprising selecting a subset of the logical data blocks that comprise the given data file and determining a ratio of a total number of logical data blocks in the subset that point to unique physical data blocks to a total number of logical data blocks in the subset.

17. The apparatus of claim 14, wherein the one or more first data files are further identified based on a target amount of data to be reduced in the first storage volume.

18. The apparatus of claim 14, wherein using the uniqueness metrics to identify the first plurality of data files includes binning the data files in the first storage volume into a plurality of bins according to their respective uniqueness metrics, each bin associated with a range of uniqueness metrics, wherein the one or more first data files are initially identified from a first bin that is associated with the highest range of uniqueness metrics.

19. The apparatus of claim 14, wherein each storage volume comprises a plurality of data storage devices.

20. The apparatus of claim 14, further comprising a plurality of host machines, each host machine configured to manage one or more of the storage volumes.

* * * * *